United States Patent [19]

Miller

[11] Patent Number: 5,265,176

[45] Date of Patent: Nov. 23, 1993

[54] METHOD AND APPARATUS FOR MAPPING PRINTER RESOLUTION USING LOCK-UP-TABLES

[75] Inventor: Steven O. Miller, Vancouver, Wash.

[73] Assignee: Hewlett-Packard Company, Palo Alto, Calif.

[21] Appl. No.: 686,732

[22] Filed: Apr. 17, 1991

[51] Int. Cl.$^5$ .................. G06K 9/42; G06K 9/32; G09G 1/06; H04N 1/32

[52] U.S. Cl. ........................ 382/47; 382/44; 395/102; 395/128; 358/451; 345/127

[58] Field of Search ............ 382/47, 44; 358/451, 358/453; 395/128, 139, 102; 340/731

[56] References Cited

U.S. PATENT DOCUMENTS

| | | | |
|---|---|---|---|
| 4,712,140 | 12/1987 | Mintzer et al. | 382/47 |
| 4,720,745 | 1/1988 | DeForest et al. | 358/166 |
| 4,725,892 | 2/1988 | Suzuki et al. | 382/47 |
| 4,747,154 | 5/1988 | Suzuki et al. | 382/47 |
| 4,907,171 | 3/1990 | Nagashima | 395/139 |
| 5,020,115 | 5/1991 | Black | 382/44 |

FOREIGN PATENT DOCUMENTS

0234018 9/1987 European Pat. Off. .
2149165 10/1984 United Kingdom .

Primary Examiner—David K. Moore
Assistant Examiner—Michael Cammarata

[57] ABSTRACT

A method is disclosed of mapping raster data input of a source data set to a destination data set, wherein the source and destination data sets have different resolutions. Initially, a resolution ratio is determined between the source data set and the destination data set. The horizontal component of the source data set is converted to the resolution of the destination data set by copying select discrete groups of the source data to form a desired number of discrete groups of the destination data. A select number of vertical, or raster, rows of the horizontally converted data set are copied to form a required number of rows, thereby completing the destination data set. Look-up tables are provided to efficiently convert the horizontal component of the source data set. An apparatus for mapping raster data input includes a computation mechanism for determining the resolution ratio, and mechanisms for converting the horizontal and vertical components of the source data set into the destination data set. Additionally, a look-up table generator is provided.

16 Claims, 9 Drawing Sheets

METHOD AND APPARATUS FOR MAPPING PRINTER RESOLUTION USING LOCK-UP-TABLES

TECHNICAL FIELD

This invention relates to a method and apparatus for converting printer input of a first resolution to another resolution.

BACKGROUND

Computer printers, and particularly printers which are capable of printing graphic images, are driven by printer-specific drivers. In most instances, the printer and driver will operate at a specific resolution, for instance, 150 dots-per-inch (DPI). As printer technology improves, higher resolution printers are provided for use. Although a printer user may want to use the new, higher resolution printer, the user may have a great deal of work stored at lower resolutions for older printers. Or, printer drivers may not immediately be available at the new resolution. If the user attempts to print directly to newer, higher resolution printers with low resolution data and print drivers, the result will likely be a distorted image, or an image that is much smaller than desired.

In order for data from one resolution to print correctly on a printer of a different resolution, the data must be mapped, or scaled, to the new resolution. Either printers or drivers may do the mapping, in either hardware or software. Historically, however, hardware solutions add cost, and software solutions may be too slow.

DISCLOSURE OF THE INVENTION

The invention is a method of efficiently mapping raster data, such as computer printer input, of a source data set to a destination data set wherein the source and destination data sets have different resolutions, with a software instruction set. Initially, a resolution ratio is determined between the source data set and the destination data set. The horizontal component of the source data set is converted to the resolution of the destination data set by copying select discrete groups of the source data to form a desired number of discrete groups of the destination data. A look-up table is used to convert or map a horizontal component of the source data set to a horizontal component of the destination data set. A select number of raster rows of the horizontally converted data set are copied to form a required number of rows, thereby completing the destination data set. The method may be used to expand or contract the destination data set relative to the source data set.

The apparatus of the invention includes a computation mechanism for determining the resolution ratio, a mechanism for converting the horizontal and vertical components of the source data set into the destination data set. A look-up table mechanism is provided to efficiently expand or contract the source data set.

An object of the invention is to provide a method and apparatus for changing a source data set, which is assembled in discrete groups, having a first resolution, to a destination data set, which is also assembled in discrete groups, and has a second resolution.

Another object of the invention is to provided a method and apparatus for generating a look-up table for converting computer printer input.

Still another object of the invention is to provide a method and apparatus for expanding printer input of a source data set to a destination data set which has a higher resolution.

A further object of the invention is to provide a method and apparatus for converting a high resolution data set to a lower resolution data set.

These and other objects and advantages of the invention will become more fully apparent as the description which follows is read in conjunction with the drawings.

DETAILED DESCRIPTION AND BEST MODE FOR CARRYING OUT THE INVENTION

Figure 1:
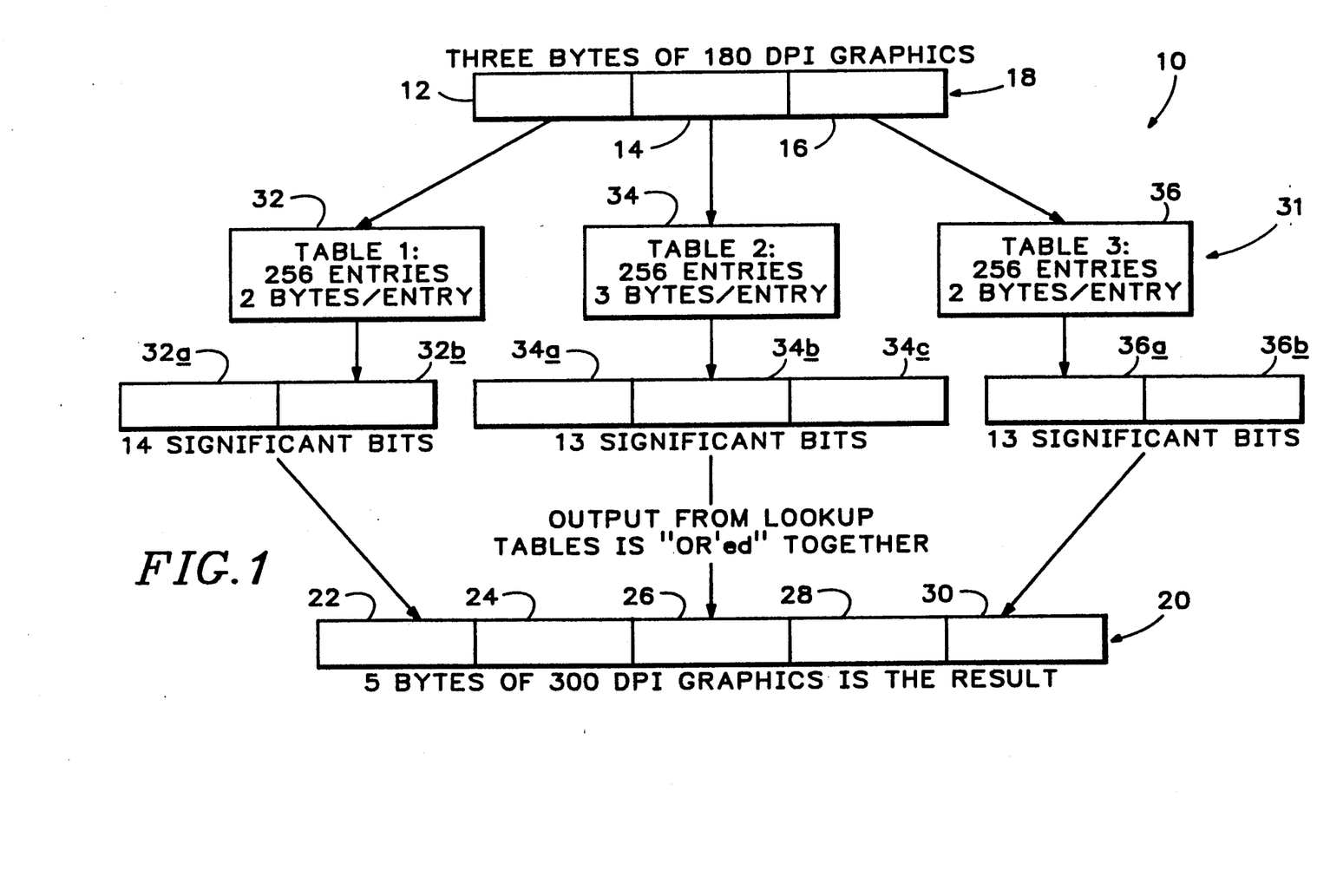
FIG. 1 is a block diagram representing the method of the invention.

Turning initially to FIG. 1, the method of the invention is represented generally at 10. The invention is capable of converting a raster data stream having a first resolution to a second resolution raster data stream. For purposes of illustration, the method and apparatus initially will be described in the context of converting, or mapping, a printer input source data set which has a resolution of 180 dots-per-inch (DPI) to a destination data set which has a resolution of 300 DPI. In the first example, the source data set is copied by replicating select components of the source data set to form the destination data set. As used herein, copied or copying means that data presented in a first resolution is mapped to another resolution. Copying is a mapping process which includes either 1) replicating select components to expand a relatively smaller source data set to a relatively larger destination data set, or, 2) coalescing a relatively larger number of components of a source data set by selectively ORing the components together to form a relatively smaller destination data set. Copying may, however, be direct, with replication of all or portions of the source data set, or with contraction of a portion of the source data set. The second example presented herein will describe the mapping of a 300 DPI source data set to a 180 DPI destination data set.

Definitions: As used herein—

"mapping" means to expand or contract data from one data set having a particular resolution to a second data set having a different resolution.

"mapping template" is a table describing how each bit in a discrete group (byte) of source data is mapped to a discrete group of destination data.

"look-up table template" is a template used to generate a series of look-up tables. This template defines the output bits of each look-up table based on the input bits.

The method and apparatus take the form of a software program which may be part of a print driver or a printer control system. The first step in the method is computing a resolution ratio between the source data set, which is used as a numerator "N", and the destination data set, which is used as a denominator "D".

$$\frac{N}{D} = \frac{180}{300} = \frac{3}{5}$$

and the resolution ratio, therefore is 3:5. This means that, in order to map the source data set to the destination data set, three groups of source data must be expanded to five groups of destination data. The resolution ratio should be the simplest ratio possible between the source data set resolution and the destination data set resolution. For simplicity, integer values for D and N are preferred, although it is possible to map values with non-integer values.

FIG. 1 depicts three bytes, or discrete groups, of data, indicated at 12, 14 and 16, which comprise a portion of source data set 18. At the end of the process, a destination data set, a horizontal component of which is partially represented at 20, includes five bytes, or discrete groups, 22, 24, 26, 28 and 30. Thus, by starting with N bytes of source data, the method generates D bytes of the horizontal component of the destination data.

Figure 2:
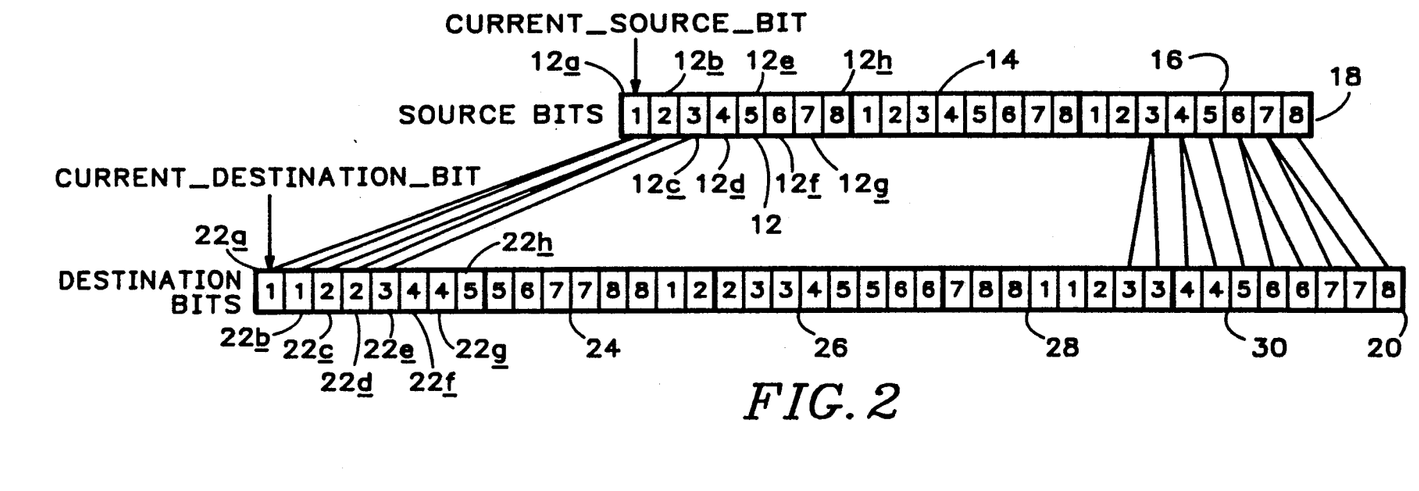
FIG. 2 is a schematic representation of a mapping template of the invention.

The process of starting with source data set and finishing with destination data set 20 may be accomplished in a number of manners. One method is simply to look at the individual bits forming bytes 12, 14 and 16, dividing the bits into discrete groups of threes, sequentially replicating two of the three bits, thereby forming five bits, and reassemble the replicated bits into the five bytes of destination data set 20. Referring now to FIG. 2, the result of selectively copying (replicating) two of the three source bits into the destination data set is depicted. Although a particular order of replicating the source data set is given in this example, any order may be used.

The foregoing method forms a part of the invention. An important feature of the method of practicing the invention involves the generation and use of look-up tables which will directly fill in the destination data set.

Referring again to FIG. 1, tables, represented generally at 31 are generated. In this example, three look-up tables 32, 34 and 36 are provided. Each look-up table has 256 entries, 0-255, which represent the possible combinations of eight bits which form each byte. Look-up Table #1, 32, and look-up Table #3, 34, will each have two bytes per entry. Look-up Table #2, 33, has three bytes per entry.

Figure 3:
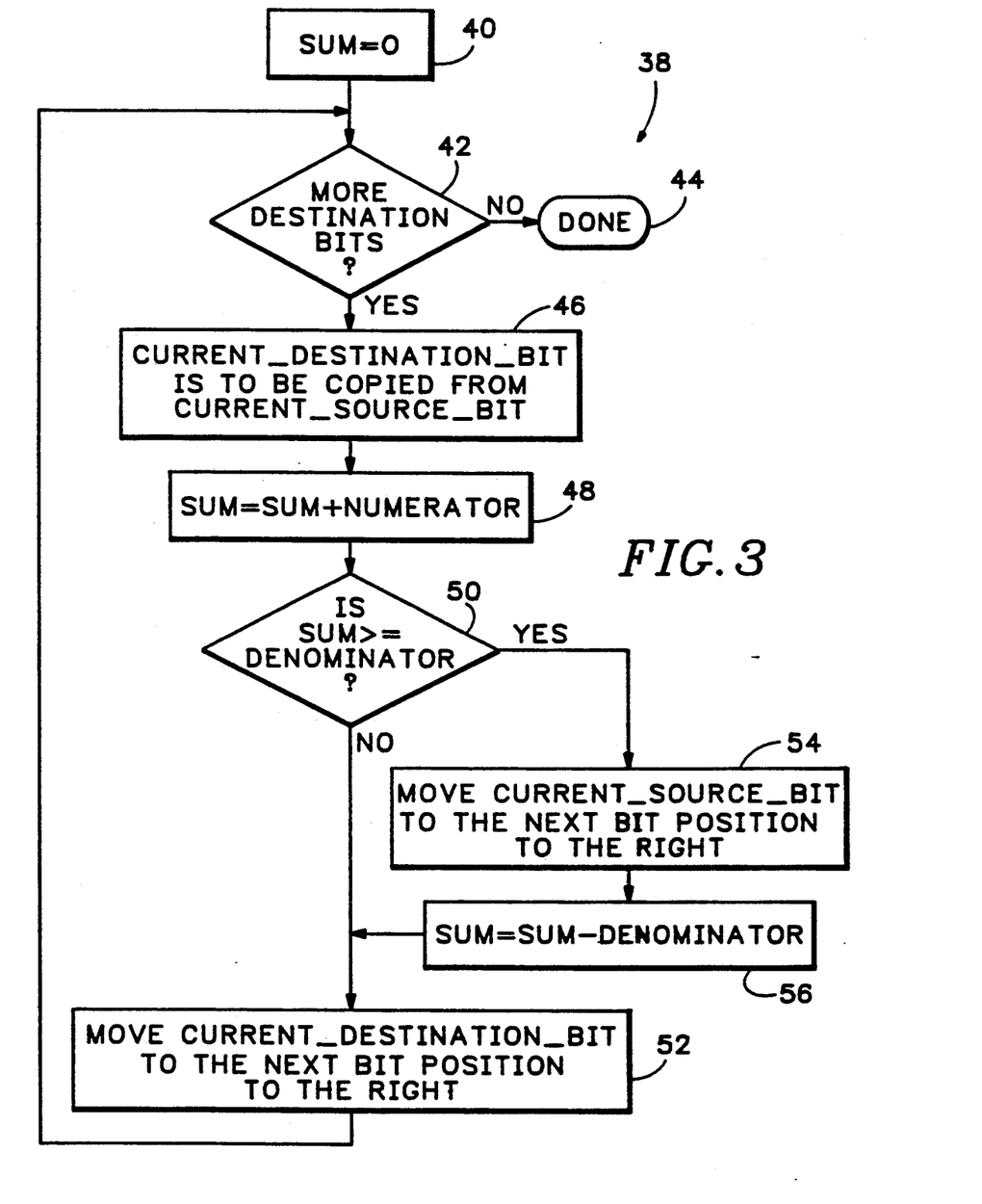
FIG. 3 is a block diagram of a method of generating a mapping template for expanding a source data set.

Referring now to FIGS. 2 and 3, the method of generating the mapping template is depicted at 38. Initially, a sum is set equal to 0, block 40. The table generator determines whether more destination bits need to be filled in, block 42. If the answer is "NO", the table generation is determined to be "DONE", block 44. If more destination bits are required, the current destination bit 22a is copied from the current source bit 12a, block 46. The sum is then set equal to the sum plus the numerator N, which in this case is "3", block 48. The generator then determines whether the sum is greater than or equal to the denominator D, which in this case is "5", block 50.

As an example, if on the first iteration of the generator program, and looking at the first bit 12a in source byte 12, the result of the addition in block 48 is that the sum equals "3", which is less than the denominator of "5", which results in a "NO" answer to block 50, causing the generator to move the current destination bit to the next bit position to the right, bit 22b, block 52. The generator loops back to block 42, receives a "YES" answer and moves to block 46. At this point, the destination bit is bit 22b while the current source bit is bit 12a. Bit 12a is replicated and loaded in bit location 22b. The generator then moves to block 48 and sets the sum equal to the sum plus the numerator, in which case the sum is now "6". Block 50 is answered in the affirmative since "6" is greater than or equal to the denominator "5", causing the generator to move to block 54, which causes the current source bit to be shifted to bit 12b. The sum is again calculated, block 56, which will result in the sum being set equal to "1". The generator moves to block 52 which causes the current destination bit to be shifted to bit 22c. Looping back to block 42, an affirmative answer provides that bit 22c will be copied from bit 12b, the sum will be set equal to "4" by block 48, block 50 will be answered in the negative and the destination bit will be shifted to block 22d, which again will be copied from block 12b. This time through the cycle, block 22d will be loaded from source bit 12b, the sum will be set to "7" (4+3). Block 50 will be answered in the affirmative, causing the source bit to be moved to 12c and the sum to be set equal to "2" (7−5). The destination bit will be shifted to bit 22c. Looping back to block 42, an affirmative answer provides that bit 22e will be copied from bit 12c, the sum will be set to "5" (2+3) by block 48. Block 50 will be answered in the affirmative, the source bit will be moved to 12d, the sum will be set equal to "0" (5−5) by block 56, and the destination bit will be moved to block 22f. The cycle will repeat until the mapping template is drawn for all of the destination bits.

Figure 4:
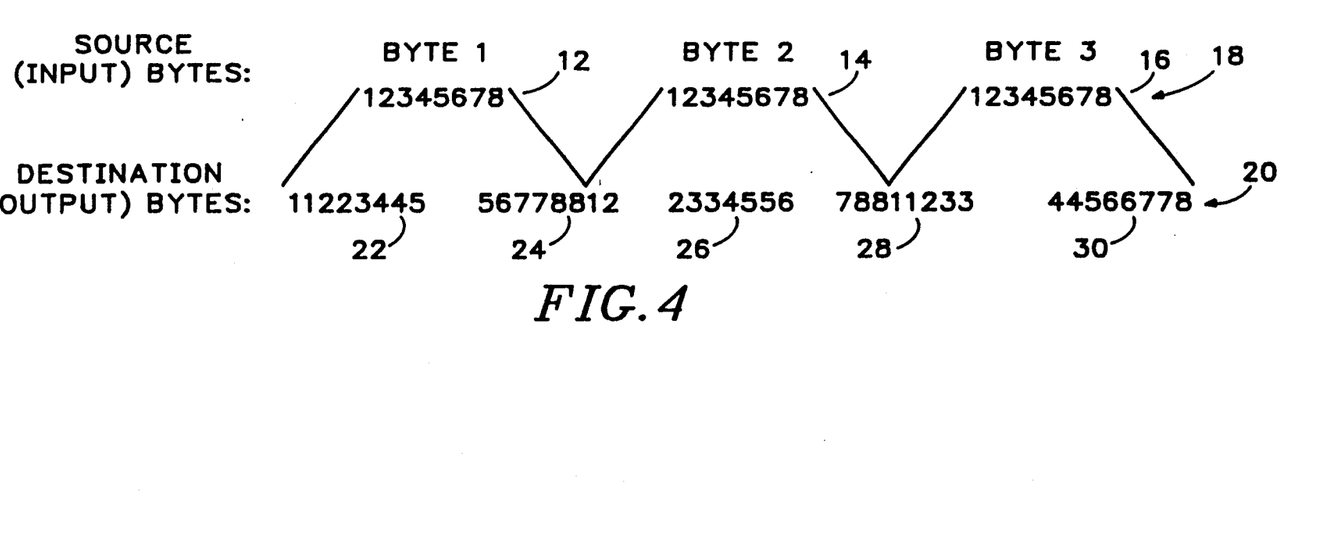
FIG. 4 is a schematic representation of a modified mapping template of the invention.

The result of the foregoing mapping results in the mapping template depicted in FIG. 4, wherein the three source or input bytes are projected onto five destination or output bytes. Turning again to FIG. 1, it is apparent that the five destination bytes cannot be filled directly from the three source bytes, and that destination byte 24 will contain data from both source bytes 12 and 14 and that destination byte 28 will contain data from source bytes 14 and 16.

In order to efficiently combine the projected, destination bytes, some of the bytes which are set up by tables 1, 2 and 3 are partially zero filled. For instances, each byte contains eight bits of data. In Table #1, only 14 significant bits are transferred into interim bytes 32a, 32b. Thirteen significant bits are contained in interim bytes 34a, 34b and 34c and also in interim bytes 36a and 36b. The interim bytes are "OR'd" together to produce the destination data set 20, which has five bytes therein. Thus, three bytes of 180 DPI data, having 24 bits therein, are expanded to five bits of 300 DPI graphic data containing 40 bits therein.

Figure 5:
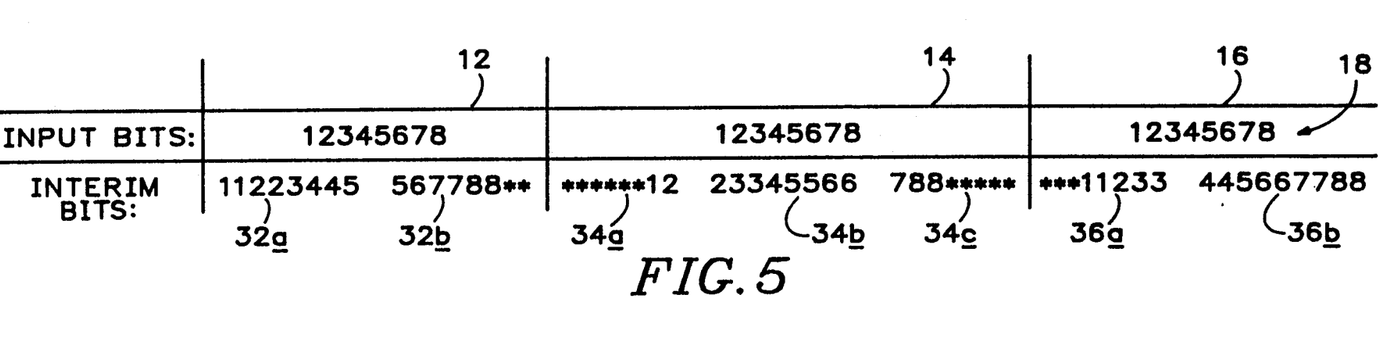
FIG. 5 is a schematic representation of a look-up table template.

Turning now to FIG. 5, the significant bits in the interim bytes are depicted, with the "0" filled bits being indicated by *'s. ORing the interim bits together results in the destination bytes depicted in FIG. 4.

Figure 6:
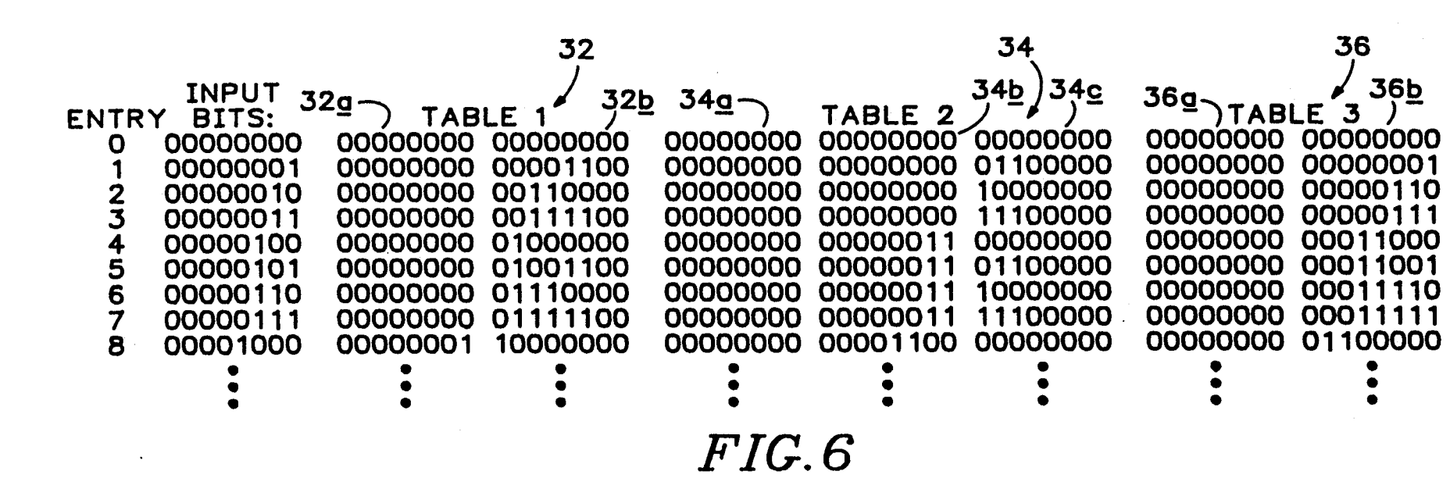
FIG. 6 is a partial representation of several look-up tables of the invention.

FIG. 6 depicts a partial representation of tables 32, 34 and 36. It should be appreciated that while only nine entries are shown for each of the tables, each table contains 256 entries therein. The 256 entries represent the 256 possible combinations which may occur in each source data byte as the byte would be expanded to fill the interim bytes. For instance, and now looking at entry number #5, if input byte 12 has the value "00000101", interim byte 32a will be completely zero filled, while interim byte 32b will have the value "01001100" loaded therein. It should be noted that in Table #1, the last two bits are always zero, as only 14 significant bits are loaded into interim bytes 32a, 32b.

Table #2 contains 13 significant bits spread over three bytes. The first six bits and last five bits of interim bytes 34a, 34c, respectively, are zero filled. Assuming that source byte 14 contains the value of entry row 5, interim byte 34a is completely zero filled, interim byte 34b has the value "00000011" and interim byte 34c has the value "01100000". Note that the locations of the "1" value in entry row five corresponds to bit locations 12f and 12h in byte 12. In the case of source byte 12, position 12f is copied directly to its respective position in interim byte 32b and ultimately to destination byte 24. The value contained in location 12h is replicated in all instances, resulting in the double entry in interim byte 32b and destination byte 24.

Thus, in order to transform three bytes of 180 DPI graphics data into five bytes of 300 DPI graphics data, the apparatus merely looks at the value of the data in an input byte, uses that value to look-up the value of the appropriate interim byte in the look-up table associated with that particular byte, and ORs the interim bytes together to form the destination bytes.

The sequence for this particular resolution ratio may be thought of as double-double-copy, as two of the source bits are replicated, resulting in four destination bits, while the third source bit is copied directly, resulting in the fifth destination bit. It should of course be appreciated that the sequence could also be expressed as copy-double-double, or double-copy-double, as it makes no difference in what order the source bits are copied and replicated so long as five destination bits result from every three source bits.

Figure 7:
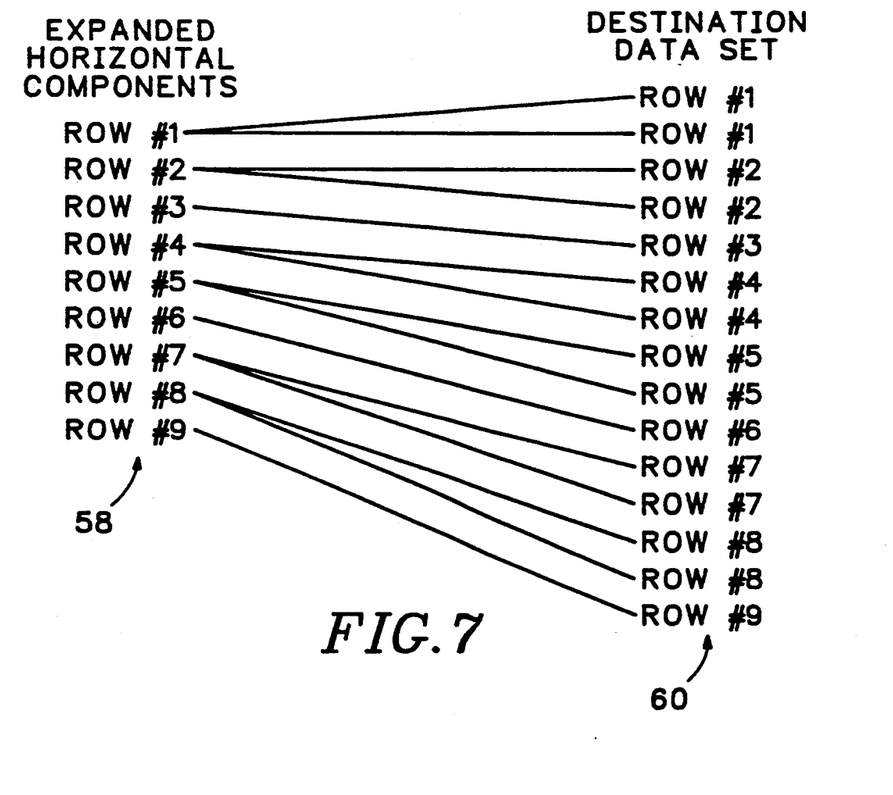
FIG. 7 is a schematic representation of a vertical expansion of raster components of the invention.

At this point in practicing the method of the invention, the input has been expanded from 180 DPI to 300 DPI in the horizontal aspect only. Were the data set to be output at this point, any image that was printed would have a horizontal resolution of 300 DPI, and a vertical resolution of 180 DPI and would be quite distorted. In order to provide a proportional expansion, the vertical component of the data sets must also be expanded. This is accomplished by using the same sequence that was used to expand the horizontal on each vertical component, or raster row, of the image. FIG. 7 depicts such an expansion beginning with the expanded horizontal component rasters, shown generally at 58 in FIG. 7, for every three raster rows, two of the rows are doubled, while the third row is directly copied, resulting in the final destination data set, depicted generally at 60.

Figure 8:
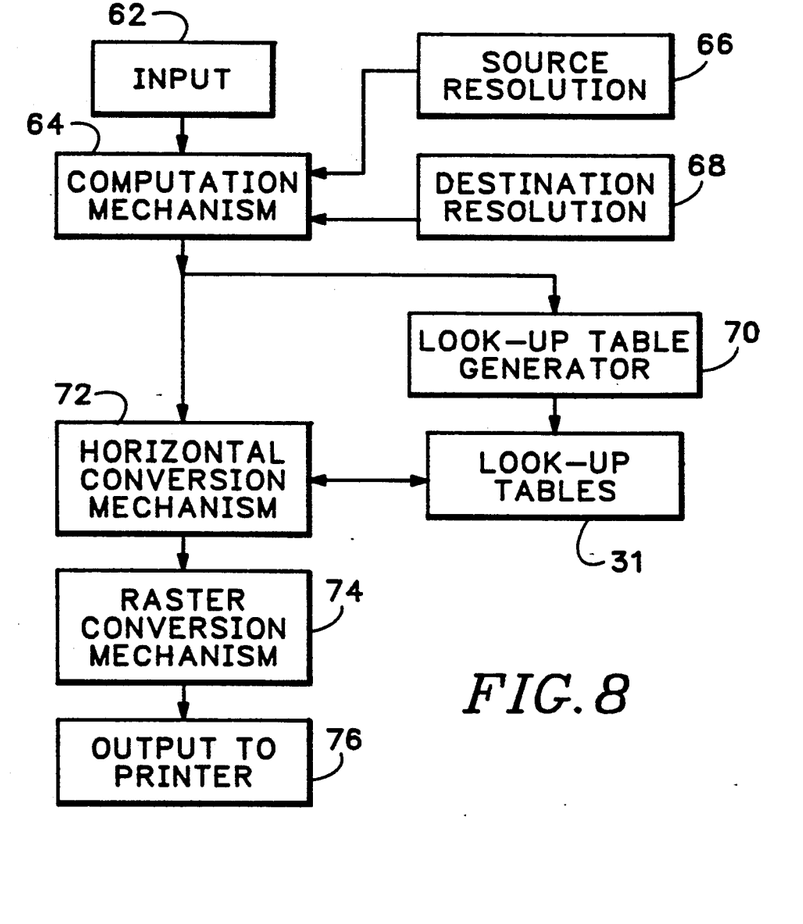
FIG. 8 is a block diagram of the apparatus of the invention.

Referring now to FIG. 8, the apparatus of the invention includes an input 62 of the source data set 18 which is passed to a computation mechanism 64. The source resolution 66 and destination resolution 68 are provided to the computation mechanism either as a part of input 62 or by a manual input. The computation mechanism is operable to compute the resolution ratio. A look-up table generator 70 generates look-up tables according to the method depicted in FIG. 3, resulting in look-up tables 32, 34, and 36.

Horizontal conversion mechanism 72 receives source data input and uses the look-up tables to obtain the interim bytes. Once the interim bytes, looked-up, they are OR'd together to form the expanded horizontal component. A raster conversion mechanism 74 then expands the vertical component of the destination data set, as described in conjunction with FIG. 7, to provide the final destination data set which is output to the printer, 76.

Figure 9:
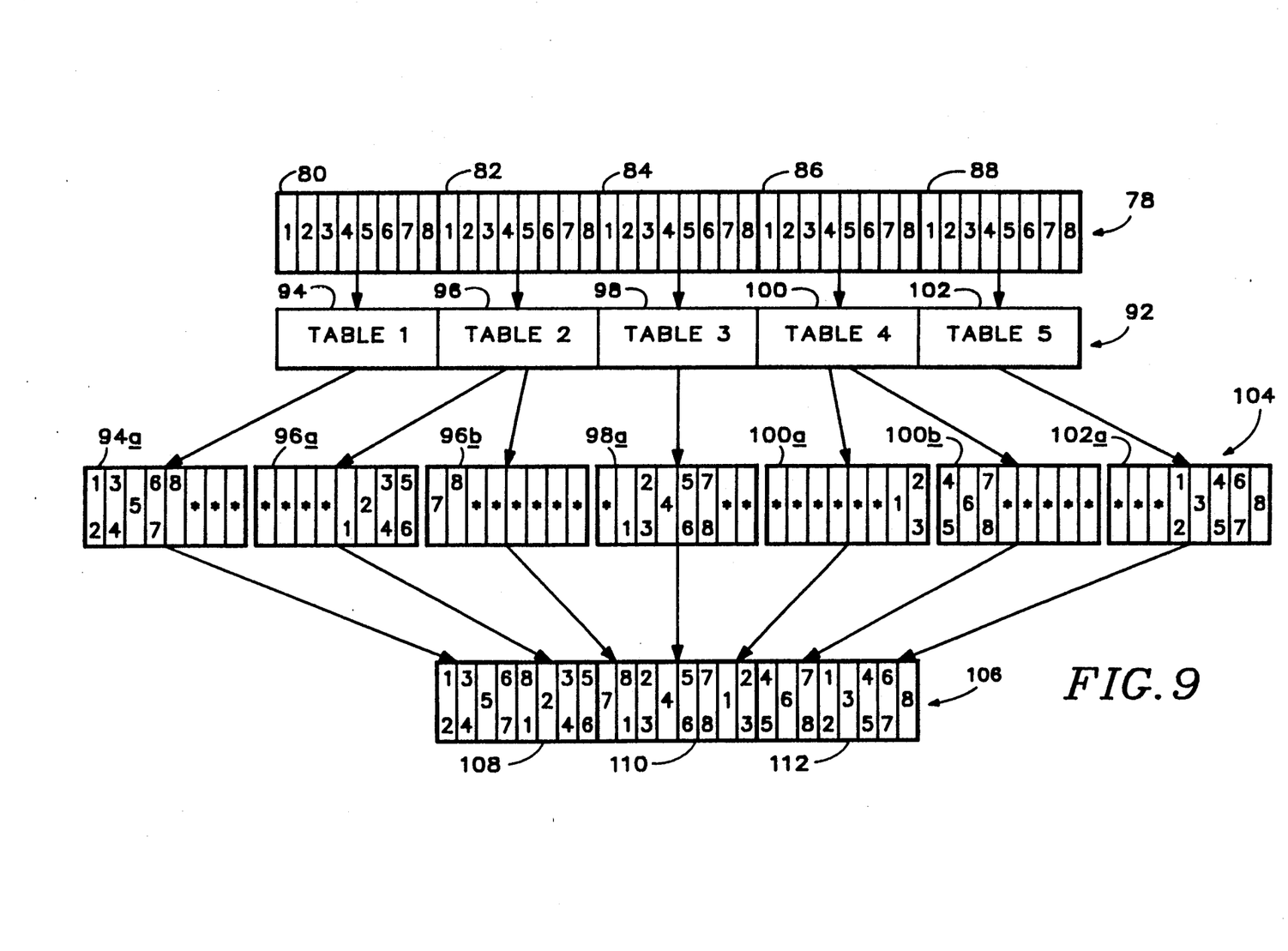
FIG. 9 is a block diagram representing the method of the invention as used for contracting a source data set to a lower resolution destination data set, which includes a look-up table template.

The preceding description explains how data may be mapped to a larger, or finer resolution. The method and apparatus are also operable to coalesce the components to condense or contract from a relatively larger source data set to a relatively smaller destination data set. The following example briefly explains how the method and apparatus would be used to map a 300 DPI graphics data set to a 180 DPI graphics data set. In this case, the resolution ratio is 5:3. Referring now to FIG. 9, a source data set 78 includes bytes 80, 82, 84, 86 and 88.

In the coalescing form of the invention, the raster conversion mechanism is activated prior to the horizontal conversion mechanism as this will eliminate the number of vertical, raster rows which need to be operated on. In the example under consideration, five rows of source data are considered as a group, with two sets of two rows being OR'd together to form two rows of destination data—resulting in a total of three rows of destination data instead of five rows. The horizontal conversion mechanism is then utilized to condense the horizontal extent of the source data set.

Figure 11:
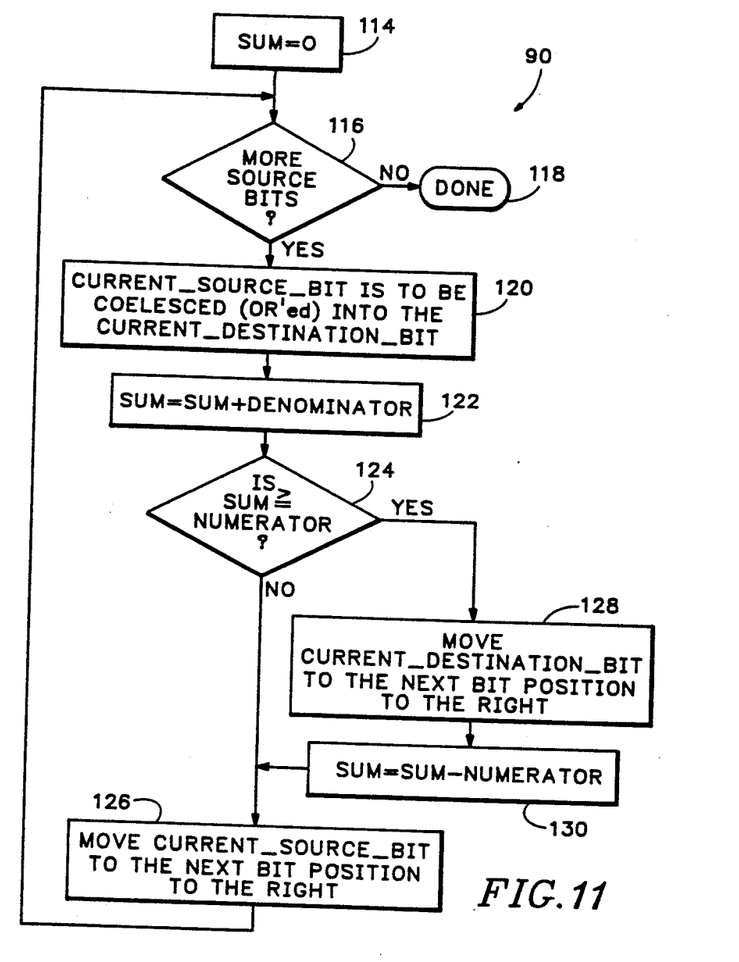
FIG. 11 is a block diagram of a method of generating a mapping template for contracting a source data set.

A method of generating a contracting mapping template, depicted generally at 90 in FIG. 11, will produce look-up tables 92, such as tables 1-5, 94, 96, 98, 100 and 102, respectively. Referring now to FIG. 11, the method of template 90 is seen to be substantially similar to that depicted in FIG. 3, and is operable to generate tables 92. The tables include a look-up template 104, which include interim bytes 94a, 96a, 98a, 100a, 100b, and 102a, which are OR'd together to for the destination data set 106, including destination data bytes 108, 110 and 112.

Figure 10:
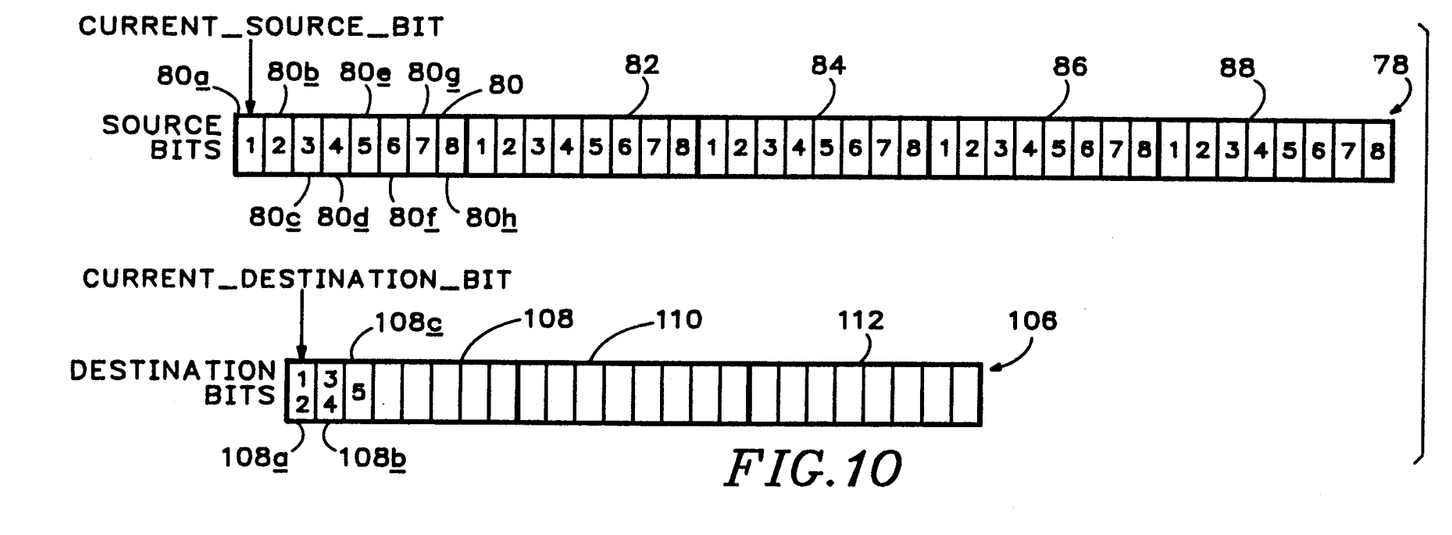
FIG. 10 is a schematic representation of a mapping template of the invention used in a contracting operation.

Referring now to FIGS. 10 and 11, the operation of mapping template 90 will be described. Initially, a sum is set to 0, block 114. The table generator determines whether more destination bits need to be filled in, block 116. If the answer is "NO", the table generation is determined to be "DONE", block 118. If the answer is "YES", the current source bit 80a is OR'd into the current destination bit 108a, block 120. The sum is then set equal to the sum plus the denominator, which in this case is 0+3, block 122. If the new sum is not greater than or equal to the numerator, which is 5, block 124, the source bit will be shifted one position to the right, block 126.

The next iteration OR's bit 80b with bit 80a, already loaded in destination bit location 108a, block 120. The sum is now equal to 6, which is greater than 5, resulting in a shift of the destination bit one place right, block 128, to bit location 108b. The sum is set to sum minus numerator, which is 6−5=1, and the next iteration takes place. The sequence continues in the same manner as explained in connection with FIG. 3, until the mapping template is fully generated.

As with the template depicted in FIG. 5, the template depicted in FIG. 9 includes interim bytes which are partially 0 filled, and which are OR'd together to form the destination data set 106. At this point, the destination data set is ready to be output to the raster device, such as a printer.

INDUSTRIAL APPLICABILITY

The method and apparatus of the invention is useful to quickly and efficiently convert any raster data set having a first resolution to another resolution, thereby enabling a device user to use data which was generated for one device on another device. The method and apparatus are particularly useful in converting printer data from one resolution to another.

Although a preferred method of practicing the invention and an apparatus therefor have been disclosed, it should be appreciated that variations and modifications may be made thereto without departing from the scope of the invention as defined in the appended claims.

What I claim is:

1. A method of mapping raster data input of a source data set, assembled in discrete groups and having a first resolution, to a destination data set, assembled in discrete groups and having a second resolution, wherein each data set has horizontal and vertical components, comprising:
    defining a resolution ratio, having a numerator "N" for the source data set, and a denominator "D" for the destination data set;
    converting the horizontal component of the source data set by selectively copying N discrete groups of the source data set to form a row of the destination data set horizontal component having D discrete groups, wherein said converting includes generating N look-up tables for looking up D discrete groups of the destination data set from N discrete groups of the source data set to generate an intermediate data set including intermediate raster data patterns;
    copying, selectively, N rows of the source data set to form D rows of the destination data set; and
    combining one or more of said intermediate raster data patterns to produce a pixel output pattern, said combining involving a bit-wise logical combination.

2. The method of claim 1 wherein the values of D and N are integer values.

3. The method of claim 1 wherein copying includes replicating the components to expand from a relatively smaller source data set to a relatively larger destination data set.

4. The method of claim 1 wherein copying includes coalescing the components to condense from a relatively larger source data set to a relatively smaller destination data set.

5. The method of claim 1 wherein generating includes copying the horizontal components of D-N discrete groups of the source data set every N discrete groups.

6. A method of mapping raster data of a source data set, assembled in bytes and having a first resolution, to a destination data set, assembled in bytes and having a second resolution, wherein each data set has horizontal and raster components, comprising:
    defining an integer resolution ratio, having an integer numerator "N" for the source data set, and an integer denominator "D" for the destination data set;
    converting the horizontal component of the source data set by selectively copying N bytes of the source data set to form a row of the destination data set horizontal component having D bytes, which includes generating N look-up tables for looking up D bytes of the destination data set from N bytes of the source data set to generate an intermediate data set including intermediate raster data patterns;
    copying, selectively, the raster components of N rows of the source data set to form D rows of the destination data set; and
    combining one or more of said intermediate raster data patterns to produce a pixel output pattern, said combining involving a bit-wise logical combination.

7. The method of claim 6 wherein copying includes replicating the components to expand from a relatively smaller source data set to a relatively larger destination data set.

8. The method of claim 6 wherein copying includes coalescing the components to condense from a relatively larger source data set to a relatively smaller destination data set.

9. The method of claim 6 wherein converting includes copying D-N bits of the source data set every N bits to form D bits of the destination data set.

10. A method of mapping computer printer graphics of a source data set, assembled in bytes and having a first, relatively smaller resolution, to a destination data set, assembled in bytes and having a second, relatively larger resolution, wherein each data set has horizontal and vertical components, comprising:
    computing an integer resolution ratio, having an integer numerator "N" for the source data set, and an integer denominator "D" for the destination data set;
    converting the horizontal component of the source data set by replicating N bytes of the source data set to form D bytes of the destination data set horizontal component by looking up D bytes of the destination data set from N bytes of the source data set including generating N look-up tables, by selectively copying the horizontal components of D-N bits of the source data set every N bits; and
    replicating the vertical components of D-N rows of the destination data set every N rows.

11. The method of claim 10 wherein the source data set has a resolution of 180 DPI and the destination data set has a resolution of 300 DPI, and the integer resolution ratio is 3:5.

12. An apparatus for mapping raster data from an input source data set having a first resolution N to a output destination data set having a second resolution D, comprising:
    a computation mechanism for computing an input/output resolution ratio;
    a horizontal conversion mechanism for converting a horizontal component of the input data set to a horizontal component of the output data set; and
    a raster conversion mechanism for converting a vertical component of the input data set to a vertical component of the output data set, said raster conversion mechanism including N look-up tables for looking up D discrete groups of the destination data set from N discrete groups of the source data set to generate an intermediate data set including intermediate raster data patterns, said raster conversion mechanism further including logic devices for logically combining one or more of said intermediate raster data patterns to produce a pixel output pattern.

13. The apparatus of claim 12 wherein which further includes a look-up table generator for generating look-up tables for the horizontal conversion mechanism.

14. The apparatus of claim 13 wherein said computation mechanism is constructed and arranged to compute an integer resolution ratio of N:D, and wherein N look-up tables are generated.

15. The apparatus of claim 14 wherein said horizontal conversion mechanism is constructed and arranged to convert the horizontal component of the input data set by copying, selectively, D bytes of the input data set to form N bytes of the output data set horizontal component by looking up D bytes of the output data set from N bytes of the input data set.

16. The apparatus of claim 12 wherein said raster conversion mechanism is constructed and arranged to copy the raster components of D rows of the input data set to provide an output data set which has N rows of raster components.

* * * * *